United States Patent
Shah et al.

(10) Patent No.: US 11,722,560 B2
(45) Date of Patent: Aug. 8, 2023

(54) RECONCILING HOST CLUSTER MEMBERSHIP DURING RECOVERY

(71) Applicant: VMware, Inc., Palo Alto, CA (US)

(72) Inventors: Alkesh Shah, Palo Alto, CA (US); Subhankar Biswas, Palo Alto, CA (US); Leonid Livshin, Palo Alto, CA (US); Brian Masao Oki, Palo Alto, CA (US); Sunil Vajir, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/452,347

(22) Filed: Oct. 26, 2021

(65) Prior Publication Data

US 2023/0131052 A1    Apr. 27, 2023

(51) Int. Cl.
*H04L 67/1031*  (2022.01)
*H04L 67/025*   (2022.01)
*H04L 41/0853*  (2022.01)
*H04L 41/0866*  (2022.01)

(52) U.S. Cl.
CPC ...... *H04L 67/1031* (2013.01); *H04L 41/0853* (2013.01); *H04L 41/0866* (2013.01); *H04L 67/025* (2013.01)

(58) Field of Classification Search
None
See application file for complete search history.

(56) References Cited

U.S. PATENT DOCUMENTS

| | | | | |
|---|---|---|---|---|
| 6,256,637 B1 * | 7/2001 | Venkatesh | ............... | G06F 9/466 718/1 |
| 7,359,953 B2 * | 4/2008 | Muir | ...................... | G06F 9/541 709/219 |
| 7,577,722 B1 * | 8/2009 | Khandekar | ......... | G06F 9/45558 718/1 |
| 8,051,180 B2 * | 11/2011 | Mazzaferri | ........... | G06F 9/5088 709/227 |
| 10,855,565 B2 * | 12/2020 | VanGilder | ........... | H04L 41/0681 |
| 2002/0103882 A1 * | 8/2002 | Johnston | .................. | H04L 67/75 709/218 |
| 2002/0103884 A1 * | 8/2002 | Duursma | ................ | H04L 67/51 709/219 |
| 2002/0184618 A1 * | 12/2002 | Bala | ..................... | G06F 9/45516 717/148 |
| 2004/0150519 A1 * | 8/2004 | Husain | ............. | G08B 13/19656 340/506 |

(Continued)

*Primary Examiner* — Ranodhi Serrao
(74) *Attorney, Agent, or Firm* — Patterson + Sheridan, LLP (57) ABSTRACT

A method for reconciling host membership information in a data center. The method generally includes querying, by a remote management device configured to manage one or more host clusters in the data center, one or more cluster stores to retrieve first host membership information for each of the one or more host clusters, each cluster store being associated with a host cluster of the one or more host clusters, comparing second host membership information stored at the remote management device for the one or more host clusters to the first host membership information to identify one or more discrepancies between the second host membership information and the first host membership information, and updating the second host membership information such that the second host membership information is consistent with the first host membership information.

20 Claims, 7 Drawing Sheets

(56) References Cited

U.S. PATENT DOCUMENTS

| | | | | |
|---|---|---|---|---|
| 2004/0221149 | A1* | 11/2004 | Rao | H04L 67/10 |
| | | | | 713/2 |
| 2006/0010433 | A1* | 1/2006 | Neil | G06F 9/45533 |
| | | | | 717/138 |
| 2012/0123880 | A1* | 5/2012 | Craft | G06Q 20/20 |
| | | | | 705/16 |
| 2013/0080559 | A1* | 3/2013 | Rao | H04L 43/10 |
| | | | | 709/208 |
| 2015/0124650 | A1* | 5/2015 | Misra | H04W 48/14 |
| | | | | 370/254 |
| 2017/0329834 | A1* | 11/2017 | O'Neill | G06F 16/27 |
| 2019/0089608 | A1* | 3/2019 | VanGilder | H04L 43/065 |
| 2020/0241862 | A1* | 7/2020 | Oruganti | G06F 11/3476 |
| 2022/0335799 | A1* | 10/2022 | P | G08B 25/00 |

\* cited by examiner

RECONCILING HOST CLUSTER MEMBERSHIP DURING RECOVERY

BACKGROUND

A plurality of physical computing devices, referred to as hosts, may be in communication over a physical network infrastructure, each host running one or more virtualized endpoints such as virtual machines (VMs), containers, or other virtual computing instances (VCIs). In a software defined network (SDN), the VCIs may be connected to logical overlay networks that may span multiple hosts and are decoupled from the underlying physical network infrastructure. Though certain aspects are discussed herein with respect to VMs, it should be noted that they may similarly be applicable to other suitable VCIs.

The hosts may be managed by one or more management devices, such as a virtualization manager. A virtualization manager may provide a single point of control to hosts in a data center. The virtualization manger may, for example, provide data center services such as access control, performance monitoring, and configuration. The virtualization manager may unify resources from the individual computing hosts to be shared among VMs in the data center. Accordingly, the virtualization manager may manage the assignment of VMs to hosts and the assignment of such resources to VMs within a given host. In some cases, these assignments are based on policies set by a system administrator.

In some cases, hosts in the data center are organized into one or more clusters that each operate as a pool of shared resources, and the virtualization manager maintains state information about each of these clusters of hosts. The state information may be stored in a database maintained by the virtualization manager and may include, for example, a list of all hosts that belong to the cluster, multi-VM resource allocation (e.g., minimum and maximum central processing unit (CPU) and memory that can be allocated to a group of VMs), VM restart orchestration (e.g., specifying a sequence in which VMs are to be restarted if a host fails and VMs are restarted elsewhere in the cluster), and/or the like.

As used herein, the list of all hosts that belong to a host cluster is termed as host membership. Any time a new host gets added to a host cluster or an existing host is removed from a host cluster, the host membership of the host cluster is updated (e.g., the state information for that host cluster) in the database maintained by the virtualization manager. Maintaining current host membership of the clusters in the data center is important for the virtualization manager to provide data center services to the clusters.

In some cases, the virtualization manager may support a file-based backup and restore mechanism that helps to recover the data center should a failure occur. Accordingly, an administrator may cause state information maintained by the virtualization manager to be backed up (e.g., periodically), such as on an external medium. In cases where the virtualization manager is restored from such a backup, state information stored for each host cluster at the time of backup that is used to restore the virtualization manager may not reflect the actual state of the data center exhibited by hosts operating in each of the host cluster(s) at the time of restoration.

In particular, host membership of hosts in each of the host clusters may have changed from the time of the backup and a time at which the virtualization manager is restored. For example, a host cluster may have been added to the data center, a host may have been added to a host cluster in the data center, a host may have been disconnected from a host cluster in the data center, and/or a host may have been moved from one host cluster to another host cluster in the data center subsequent to when the backup of state information maintained by the virtualization manager occurred. Thus, such state information restored from the backup may no longer reflect the actual host membership as exhibited by hosts and clusters currently operating in the data center. In other words, host membership of one or more clusters captured by the backup may be stale or inconsistent with the current runtime host membership. Incorrect host membership at the virtualization manager when the virtualization manager is restored from backup may impact the operation of services provided by the virtualization manager. For example, services provided by the virtualization manager for a host cluster may not operate on the correct set of hosts where a host has been added or removed from a host cluster subsequent to the backup of state information maintained by the virtualization manager.

Accordingly, there is a need in the art for techniques of reconciling host membership state information when the virtualization manager is restored from a backup.

It should be noted that the information included in the Background section herein is simply meant to provide a reference for the discussion of certain embodiments in the Detailed Description. None of the information included in this Background should be considered as an admission of prior art.

SUMMARY

The technology described herein provides a method for reconciling host membership information in a data center. The method generally includes querying, by a remote management device configured to manage one or more host clusters in the data center, one or more cluster stores to retrieve first host membership information for each of the one or more host clusters, each cluster store being associated with a host cluster of the one or more host clusters, comparing second host membership information stored at the remote management device for the one or more host clusters to the first host membership information to identify one or more discrepancies between the second host membership information and the first host membership information, and updating the second host membership information such that the second host membership information is consistent with the first host membership information.

Further embodiments include a non-transitory computer-readable storage medium storing instructions that, when executed by a computer system, cause the computer system to perform the method set forth above, and a computer system including at least one processor and memory configured to carry out the method set forth above.

DETAILED DESCRIPTION

Aspects of the present disclosure introduce a distributed data store (e.g., a cluster store) that stores state information, including host membership information, about a cluster of hosts. The cluster store described herein may be distributed across a plurality of hosts in a cluster (e.g., all or less than all hosts in the cluster) such that a certain number of host failures may be tolerated in the cluster while still maintaining availability of the entirety of the cluster store.

According to certain aspects described herein, state information stored in a cluster store may include a list of all hosts that belong to that cluster (referred as host membership information), as well as a list of services configured for that cluster. Thus, aspects of the present disclosure introduce a method for reconciling stale state information maintained for each host cluster of a data center that is loaded at a virtualization manager when the virtualization manager is restored from a backup. State information configured for each cluster, maintained in one or more cluster stores in the data center, may be collected by the virtualization manager when the virtualization manager is recovered from a backup and used to correct state information loaded and maintained at the virtualization manager.

In a particular example, a virtualization manager may be implemented to manage a software-defined data center (SDDC) environment, including a plurality of hosts and two or more clusters. An administrator may cause state information maintained by the virtualization manager to be backed up, such as on an external medium. Subsequent to backing up the state information, a change occurs to one or more of the clusters in the SDDC. For example, subsequent to the backup, one or more hosts move from a first cluster to a second cluster in the SDDC, one or more new hosts are added to an existing cluster, one or more hosts are disconnected, and/or one or more new host clusters are created. In this example, when the virtualization manager is restored from the backup, the state information re-loaded at the virtualization manager does not reflect the current state of the clusters operating in the SDDC.

Accordingly, aspects of the present disclosure enable the virtualization manager to consume, for each cluster in the SDDC (excluding newly added clusters), the state information in the cluster store. Based on the state information from the cluster stores, state information, and more specifically host membership information, for each of the clusters loaded at the virtualization manager (e.g., when the virtualization manager is restored from backup) may be reconciled to match the current runtime state of hosts and clusters in the SDDC. As described in more detail below, reconciliation at the virtualization manager may involve the use of provisioning primitives including primitives to move a host to/from a host cluster, add a host to a host cluster, disconnect a host, and/or add a new host cluster.

Reconciling host membership information at the virtualization manager may ensure that services operating at each cluster are not adversely impacted and are applied to the correct set of hosts in each cluster. Further, in certain aspects, by using provisioning primitives, no additional configuration may be needed to perform reconciliation, and other subsystems within the virtualization manager that react to host membership changes (e.g., other cluster services such as a distributed resource scheduler (DRS)) may participate in the reconciliation process as they would during runtime to take appropriate action, where applicable.

It is noted that while certain embodiments are described herein with respect to the reconciliation of host membership information (e.g., included as part of the state information) at the virtualization manager, reconciliation of other state information (e.g., VM restart orchestration, etc.) at the virtualization manager may be performed in a similar manner.

Further, it is noted that while certain embodiments are described herein with respect to virtualized computing environments and cluster stores, techniques described herein may also be employed for other types of distributed storage objects, such as other distributed data stores or objects, whether in virtualized computing environments or physical computing environments. For example, a non-virtualized computing environment may include a distributed data store on a cluster of computing devices, such as storing state information related to the computing devices in the cluster, and this distributed data store may be managed by a management component of the non-virtualized computing environment in order to employ techniques as described herein.

Figure 1:
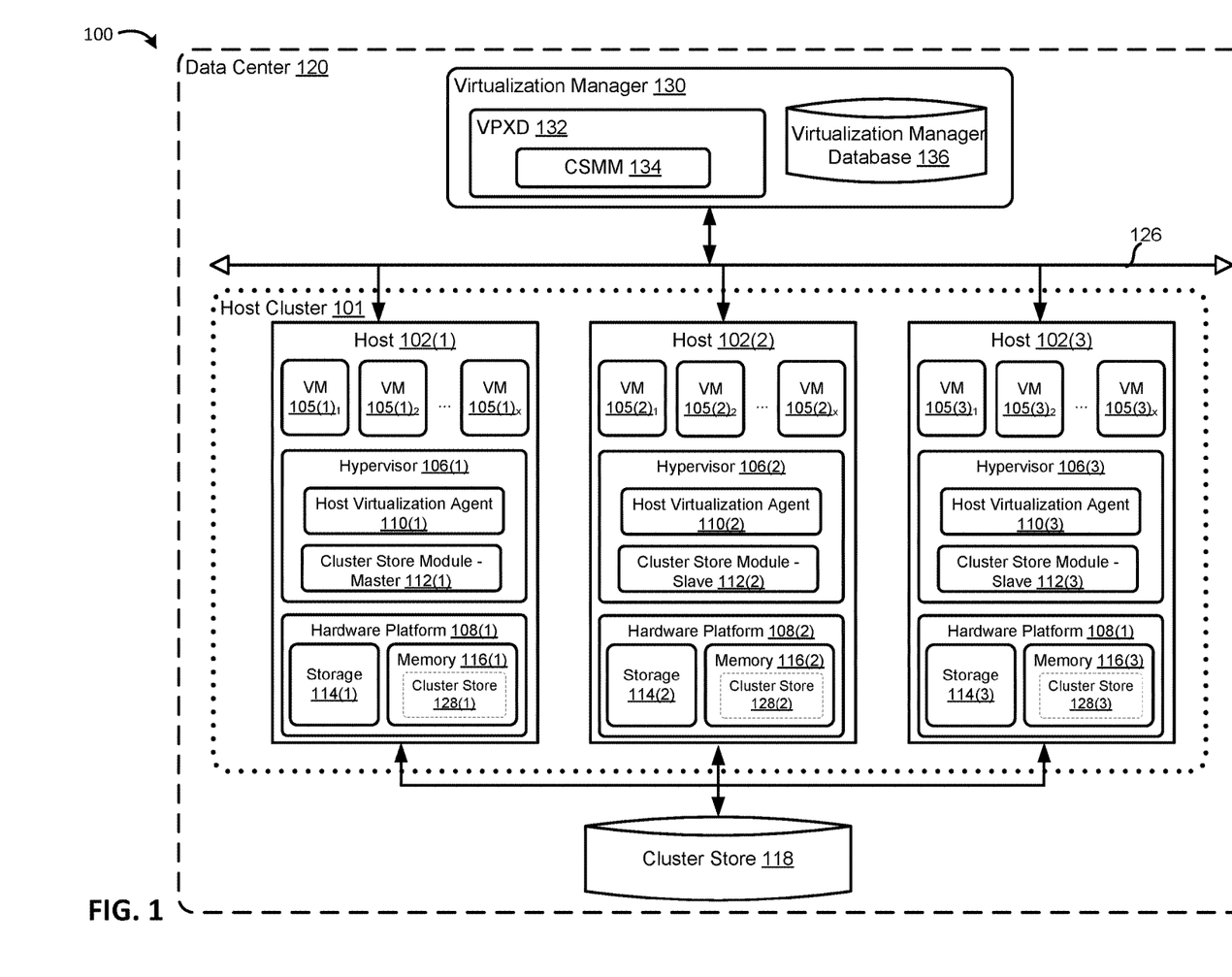
FIG. 1 is a diagram depicting example physical and virtual network components with which embodiments of the present disclosure may be implemented.

FIG. 1 is a diagram depicting example physical and virtual network components with which embodiments of the present disclosure may be implemented. Networking environment 100 includes data center 120 which generally represents a set of networked computing entities, and may comprise a logical overlay network. Data center 120 includes host cluster 101, a management network 126, a virtualization manager 130, and a cluster store 118. Management network 126 may be a physical network or a virtual local area networks (VLAN).

Each of hosts 102 may be constructed on a server grade hardware platform 108, such as an ×86 architecture platform. For example, hosts 102 may be geographically co-located servers on the same rack or on different racks. A host 102 is configured to provide a virtualization layer, also referred to as a hypervisor 106, that abstracts processor, memory, storage, and networking resources of hardware platform 108 into multiple virtual machines $105_1$ to $105_x$ (collectively referred to as VMs 105 and individually referred to as VM 105) that run concurrently on the same host 102. As shown, multiples VMs 105 may run concurrently on the same host 102.

Each of hypervisors 106 may run in conjunction with an operating system (OS) (not shown) in its respective host 102. In some embodiments, hypervisor 106 can be installed as system level software directly on hardware platform 108 of host 102 (often referred to as "bare metal" installation) and be conceptually interposed between the physical hardware and the guest OSs executing in the virtual machines. In certain aspects, hypervisor 106 implements one or more logical entities, such as logical switches, routers, etc. as one or more virtual entities such as virtual switches, routers, etc. In some implementations, hypervisor 106 may comprise system level software as well as a "Domain 0" or "Root Partition" VM (not shown) which is a privileged machine that has access to the physical hardware resources of the host. In this implementation, one or more of a virtual switch, virtual router, virtual tunnel endpoint (VTEP), etc., along with hardware drivers, may reside in the privileged VM. Although aspects of the disclosure are described with reference to VMs, the teachings herein also apply to other types of virtual computing instances (VCIs) or data compute nodes (DCNs), such as containers, which may be referred to as Docker containers, isolated user space instances, namespace containers, etc., or even to physical computing devices. In certain embodiments, VMs 105 may be replaced with containers that run on host 102 without the use of hypervisor 106.

Virtualization manager 130 generally represents a component of a management plane comprising one or more computing devices responsible for receiving logical network configuration inputs, such as from a network administrator, defining one or more endpoints (e.g., VCIs and/or containers) and the connections between the endpoints, as well as rules governing communications between various endpoints.

In an embodiment, virtualization manager 130 is a computer program that executes in a central server in data center 120. Alternatively, in another embodiment, virtualization manager 130 runs in a VCI. Virtualization manager 130 is configured to carry out administrative tasks for data center 120, including managing hosts 102, managing VMs 105 running within each host 102, provisioning VMs 105, transferring VMs 105 from one host to another host, transferring VMs 105 between data centers, transferring application instances between VMs 105 or between hosts 102, and load balancing among hosts 102 within data center 120. Virtualization manager 130 takes commands from components located on management network 126 as to creation, migration, and deletion decisions of VMs 105 and application instances in data center 120. However, virtualization manager 130 also makes independent decisions on management of local VMs 105 and application instances, such as placement of VMs 105 and application instances between hosts 102.

In certain embodiments, virtualization manager 130 comprises a virtual provisioning X daemon (VPXD) 132, which represents an agent within virtualization manager 130 that performs management and provisioning functions for hosts 102 associated with virtualization manager 130. VPXD 132 may communicate with each host 102 via host virtualization agent 110 in hypervisor 106 of each host 102. In particular, commands from virtualization manager 130 may be sent from VPXD 132 to host 102 through host virtualization agent 110 running on hypervisor 106.

In certain embodiments, VPXD 132 comprises cluster store membership manager (CSMM) 134, which manages state information, of hosts 102, stored in virtualization manager database 136. Virtualization manager database 136 is a database used to store and organize server data. In certain embodiments, virtualization manager database is an SQL server database. In certain embodiments, virtualization manager database 136 includes state information about each of hosts 102 and/or VMs 105 in each host cluster 101. The state information stored for host cluster(s) 101 in virtualization manager database 136 may be an internal representation of each host cluster 101 and host 102 in data center 120. In certain aspects, the state information stored in virtualization manager database 136 includes host membership information for each host cluster 101 in data center 120, as well as services configured for each of these host clusters 101. Any time a host 102 gets added to a host cluster 101, or an existing host 102 is removed from a host cluster 101, the host membership maintained for that host cluster 101 is updated in virtualization manager database 136. The state information may further include, for example, minimum and maximum central processing unit (CPU) and memory that can be allocated to a group of VMs 105, VM 105 restart orchestration (e.g., specifying a sequence in which VMs 105 are to be restarted if a host fails and VMs are restarted elsewhere in the cluster), and/or the like.

According to embodiments described herein, CSMM 134 manages information for each host cluster 101 stored in cluster store 118. Cluster store 118 is a distributed data store that stores state information about its respective host cluster 101. Each host cluster 101 may have its own cluster store 118. Cluster store 118 may be distributed across a plurality of hosts 102 in a host cluster 101 (e.g., all or less than all hosts 102 in the host cluster 101). In particular, a local copy 128 of cluster store 118 (e.g., including at least information regarding host membership and services configured for that host cluster 101) may be available in memory 116 at a plurality of hosts 102.

In certain embodiments, CSMM 134, through host virtualization agent 110 on each host 102, manages changes to each cluster store 118 in data center 120. In particular, CSMM 134 may persist host membership information in cluster store 118 through host virtualization agent 110. For example, CSMM 134 may send commands through host virtualization agent 110 to add a host 102 to cluster store 118 of one host cluster 101 and/or remove a host 102 from cluster store 118 of the host cluster 101. CSMM 134 may be responsible for persisting host membership information in both virtualization manager database 136 and each cluster store 118 such that information stored in each of these locations is consistent. Steps for persisting host membership changes to both virtualization manager database 136 and cluster store(s) 118 are described in more detail with respect to FIG. 2.

In certain embodiments, a cluster store module 112 is implemented on each host 102. The cluster store module 112 takes instructions from host virtualization agent 110 to update cluster store 118, such as to add a host 102 and/or remove a host 102 from cluster store 118 of the host cluster 101. Cluster store module 112 may be running on host 102, in hypervisor 106 on host 102 (as shown in FIG. 1), on the OS of host 102, and/or any other feasible location for interacting with host virtualization agent 110 and cluster store 118.

In a host cluster 101 with one host 102, the cluster store module 112 is a master module. In a host cluster 101 with two or more hosts 102, one cluster store module 112 is a master module while other cluster store module(s) 112 are slave module(s), as shown in example networking environment 100 of FIG. 1. In the host cluster 101 with two or more hosts 102, at any given time, any of the cluster store modules 112 in host cluster 101 may be the master module. Master cluster store module 112 ensures that conflicts do not exist between writes to cluster store 118 by different slave cluster store modules 112 in host cluster 101. Further, master cluster store module 112 may be configured to determine which hosts 102 are part of the host cluster 101, as well as detect the failure of hosts 102.

According to certain embodiments, state information stored in cluster store 118 for each host cluster 101 may be collected and used by virtualization manager 130 to update state information for each host cluster 101 maintained in virtualization manager database 136. Collection of such information may occur when state information for a host cluster 101 in virtualization manager database 136 does not match state information stored in cluster store 118 associated with that host cluster 101. Further, where necessary, virtualization manager 130 may use the collected state information to update state information maintained for all host clusters 101 at virtualization manager database 136.

Figure 2:
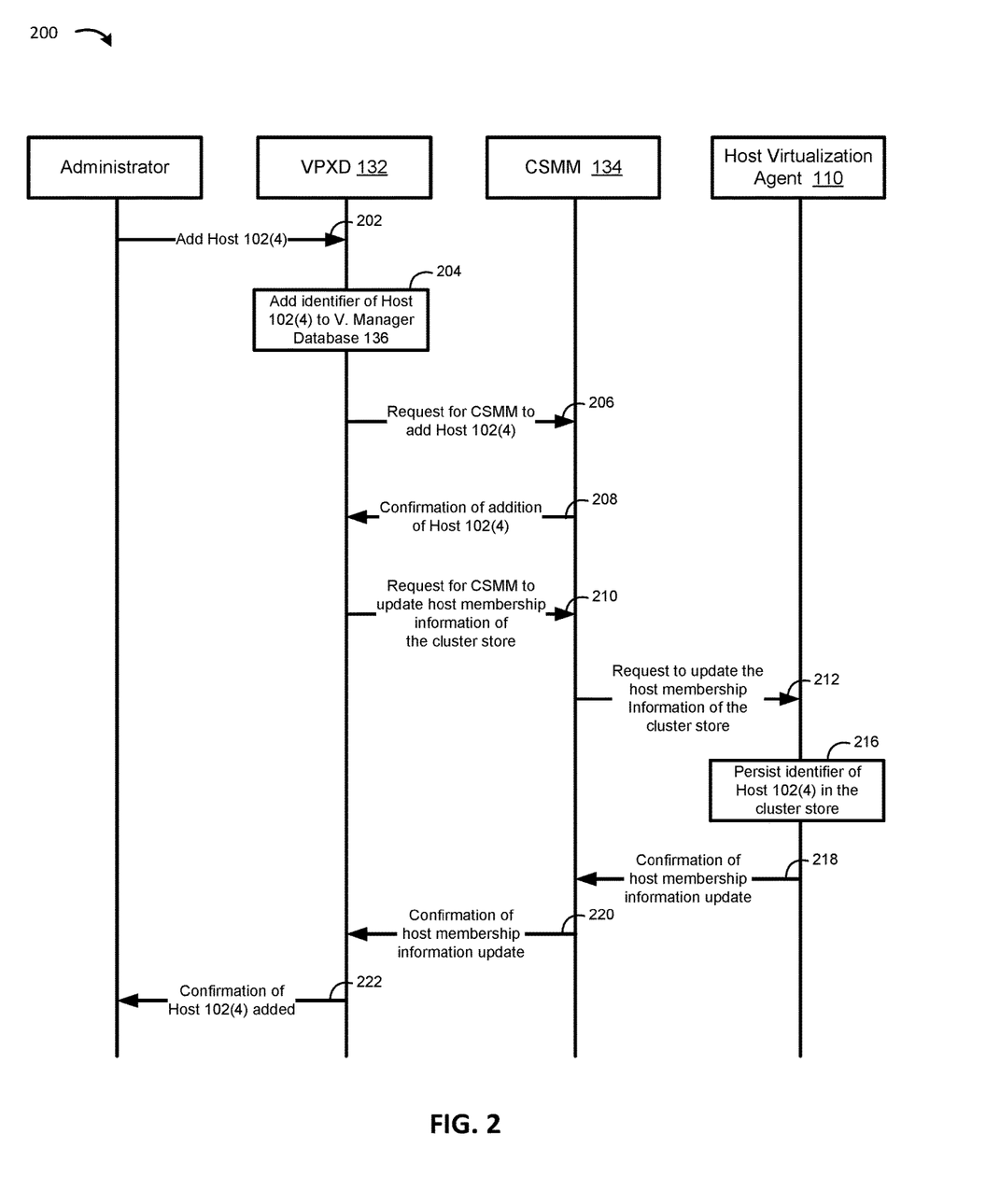
FIG. 2 is a call flow diagram illustrating example operations related to persisting host membership information in both a virtualization management database and a cluster store according to embodiments of the present disclosure.

FIG. 2 is a call flow diagram illustrating example operations 200 for persisting host membership information for a host cluster 101 in both virtualization management database 136 and a cluster store 118 associated with the host cluster 101, according to embodiments of the present disclosure. Operations 200 may be performed by VPXD 132, CSMM 134, and host virtualization agent 110 illustrated in FIG. 1. While FIG. 2 is described with respect to persisting host membership information in both virtualization management database 136 and a cluster store 118, persisting other state information may be performed in a similar manner.

As shown in FIG. 2, operations 200 begin at operation 202 by an administrator adding a host, e.g., host 102(4), to an existing host cluster 101. For purposes of illustration, FIG. 2 illustrates the addition of host 102(4) to host cluster 101 illustrated in FIG. 1, such that host cluster 101 includes four hosts 102 (e.g., host 102(1), host 102(2), host 102(3), and host 102(4)) after the addition. While the embodiment of FIG. 2 illustrates operations 200 for adding an identifier of host 102(4) to virtualization manager database 136 and cluster store 118, similar operations may be performed for removing an identifier of a host 102 where the host 102 is disconnected and/or moving identifiers of hosts 102 across host clusters 101.

The addition of information associated with host 102(4) to virtualization manager database 136 and cluster store 118 may be achieved using provisioning primitives. As used herein, a provisioning primitive is the smallest unit of processing available to virtualization manager 130 to perform a function on virtualization manager database 136 and/or cluster store 118. Such functions may include the addition and/or removal of information from virtualization manager database 136 and/or cluster store 118 when a host 102 is added to a host cluster 101, a host 102 is disconnected, a host cluster 101 is added, or a host cluster 101 is removed. Primitives may be invoked during runtime via application programming interface (API) invocations.

In response to the addition of host 102(4), at operation 204, VPXD 132 adds an identifier of host 102(4) to virtualization manager database 136, as well as information about host cluster 101 which host 102(4) is added to. To inform CSMM 134 of the addition of host 102(4), at operation 206, VPXD 132 transmits a request for CSMM 134 to add host 102(4). In response, at operation 208, CSMM 134 acknowledges the addition of host 102(4) to VPXD 132.

To update information stored in cluster store 118 associated with host cluster 101 where host 102(4) was added, at operation 210, VPXD 132 transmits a request to CSMM 134 to update host membership information maintained in cluster store 118. Accordingly, at operation 212, CSMM 134 communicates with a host virtualization agent 110 (e.g., communication may be with host virtualization agent 110 on any host 102 in host cluster 101), to update host membership information of the cluster maintained in cluster store 118. In certain embodiments, an API is invoked to update key-value pairs stored in cluster store 118, where each key-value pair corresponds to an identifier of a host 102 which is part of the host cluster 101. For example, an API is invoked to add a key-value pair for host 102(4) to cluster store 118. At operation 216, host virtualization agent 110 persists the identifier of host 102(4) (e.g., the key-value pair) in cluster store 118.

Following the addition of an identifier for host 102(4) to cluster store 118, host virtualization agent 110 confirms the host membership update to cluster store 118, at operation 218. At operations 220, CSMM 134 confirms the host membership update to cluster store 118, and at operation 222, VPXD 132 confirms the addition of host 102(4) to data center 120 (and more specifically, the update to virtualization manager database 136 and cluster store 118 for host 102(4)).

Figure 3:
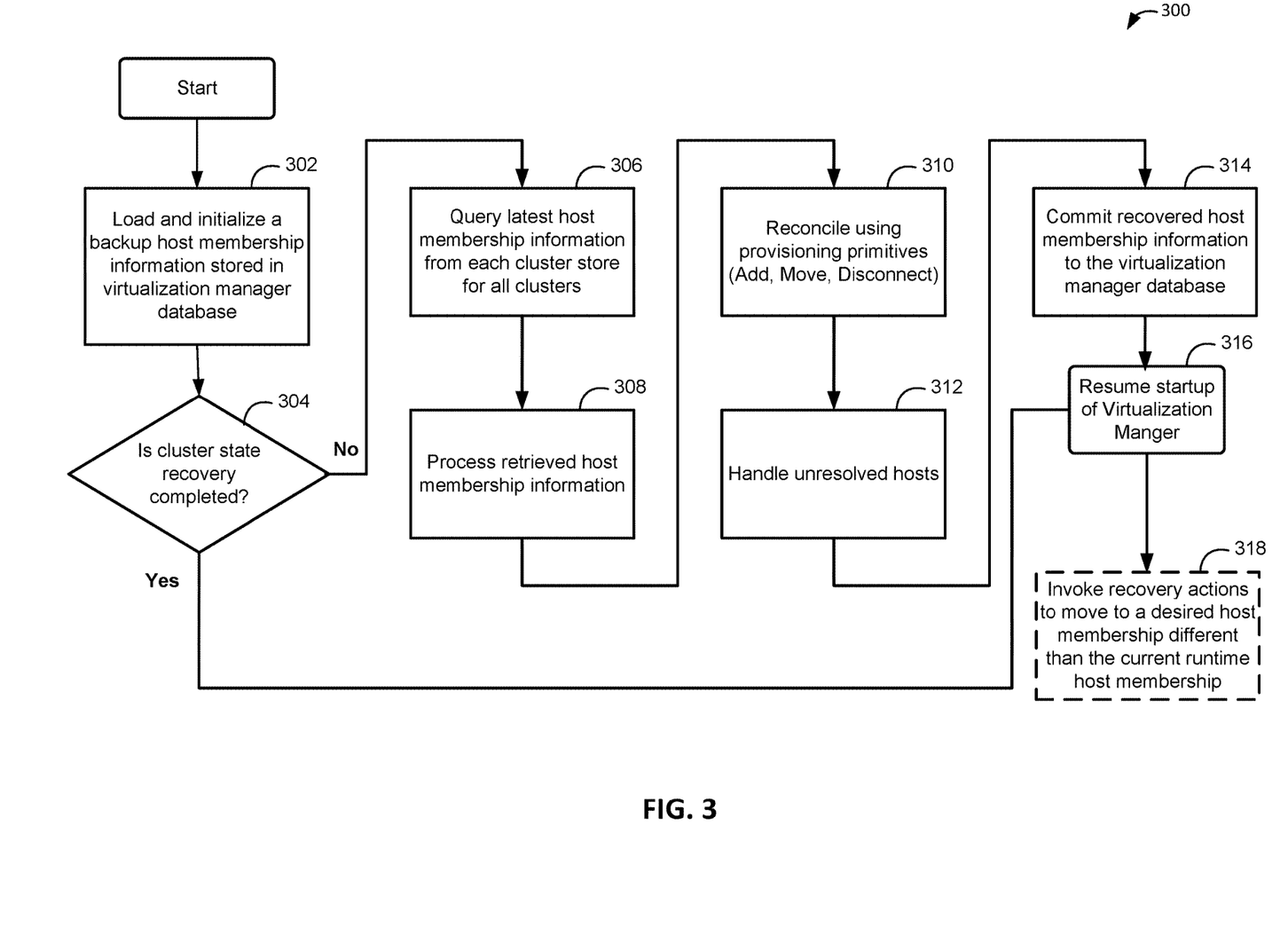
FIG. 3 illustrates an example workflow for reconciling host membership information stored at a virtualization manager according to embodiments of the present disclosure.

As described in more detail with respect to FIG. 3, such provisioning primitives used to update virtualization manager database 136 and cluster store 118 may also be used when host membership information stored in virtualization manager database 136 does not match host membership information stored in one or more cluster stores 118 after virtualization manager 130 is restored from backup.

FIG. 3 illustrates an example workflow 300 for reconciling host membership information, for one or more host clusters, stored at a virtualization manager 130, according to embodiments of the present disclosure. Workflow 300 may be performed by components of virtualization manager 130 illustrated in FIG. 1, such as VPXD 132 and CSMM 134. Workflow 300 may be performed following restoration of virtualization manager 130 to a backup state, in order to reconcile host membership information of the restored state to a current host membership.

As shown in FIG. 3, workflow 300 begins at block 302 where state information, including host membership information, stored in a backup is loaded and initialized at virtualization manager 130. As mentioned, this backup state may be stale state information. In other words, the host membership information may not accurately represent the current runtime state of host(s) 102 and host cluster(s) 101 in data center 120.

At block 304, a flag is checked to determine whether cluster state recovery is completed. In particular, where virtualization manager 130 was restored using backup host membership information, such information for one or more host clusters 101 stored in virtualization manager database 136 may need to be reconciled. In this case, the flag may indicate cluster state recovery is not completed. On the other hand, the host membership information, for one or more host clusters, may not need to be reconciled where virtualization manager 130 is restored from a backup. Accordingly, for this case, a flag associated with virtualization manager 130 may indicate recovery of the host membership information stored in virtualization manager database 136 is not needed. Thus, at block 316, startup of virtualization manager 130 may resume.

Where virtualization manager 130 was previously backed up and then restored from the backup, the flag associated with virtualization manager 130 indicating recovery is needed may trigger VPXD 132 to reconcile the backup host cluster membership information stored in virtualization manager database 136. Further, in certain embodiments, an administrator may manipulate the flag associated with virtualization manager 130 such that the flag indicates recovery of the backup host membership information is necessary. In such a case, the backup host membership information loaded and initialized in virtualization manager database 136 may be reconciled to match host membership information desired by the administrator.

In cases where recovery is not completed, at block 306, virtualization manager 130 through VPXD 132 and CSMM 134 may access a cluster store 118 associated with each host cluster 101 to query host membership information for each host cluster 101. CSMM 134 may access cluster store 118 by a query to any host virtualization agent 110 running in each host cluster 101. For example, where three host clusters 101 exist, VPXD 132 through CSMM 134 may access three different cluster stores 118 by a query to a host virtualization agent 110 of each host cluster 101. Each of the three queries may be used to obtain information about hosts 102 belonging to each of the three different host clusters 101. Subsequently, at block 308, virtualization manager 130 may process the retrieved host membership information from each cluster store 118. Processing by virtualization manager 130 may include comparing the backup host membership information for each host cluster 101 to host membership information from each cluster store 118 to identify discrepancies in host cluster membership information. Identified discrepancies may indicate to virtualization manager 130 what hosts 102 were added, moved, and/or disconnected subsequent to the backup of virtualization manager 130.

At block 310, virtualization manager 130 may invoke reconciliation logic to reconcile the backup host membership information such that the backup host membership information is updated to be consistent with the host membership information maintained by each cluster store 118. As mentioned herein, reconciliation logic may make use of provisioning primitives for adding, moving, and/or disconnecting hosts 102. Reconciliation may be described in more detail with respect to the example reconciliation illustration described with respect to FIGS. 4 and 5.

In certain embodiments, subsequent to the backup of virtualization manager 130, a host 102 may be removed from a host cluster 101 and either (1) added to a new host cluster 101 created by an administrator during backup of virtualization manager 130, (2) not added to a new host cluster 101 but still connected as a host 102 in data center 120, or (3) disconnected from data center 120 altogether. In any of these cases, when virtualization manager 130 queries cluster store(s) 118, virtualization manager 130 may not obtain any information about host 102 removed from its original host cluster 101 because host 102 does not belong to any of the host cluster(s) 101 that virtualization manager 130 queried (e.g., virtualization manager may not be aware of, and therefore does not query, new host cluster(s) 101 added during backup). Virtualization manager 130 may be aware that this host 102 previously existed in the data center 120 based on the backup host membership information indicating the host 102 prior belonged to one of the host cluster(s) 101. However, virtualization manager 130 does not have any current information for the host 102 and, therefore, may not know how to accurately reconcile this host 102. For example, virtualization manager 130 may not know whether to add this host 102 to a new host cluster 101 created during backup or to remove this host from the host membership information stored at virtualization manager database 136. Such hosts 102 for which virtualization manager 130 does not have current membership information may be referred to as unresolved hosts.

At block 312, virtualization manager 130 may handle such an unresolved host 102 by indicating to an administrator of data center 120 that the host 102 is unresolved. Virtualization manager 130 may ask an administrator of data center 120 to correct data associated with unresolved host 102 stored in virtualization manager database 136.

Operations at block 312 may also be taken in embodiments where one or more cluster stores 118 cannot be accessed (e.g., due to a hardware failure of power failure) for querying. For example, in cases where FIG. 1 is showing the current runtime state of data center 120 and cluster store 118 cannot be accessed, then hosts 102(1), 102(2), and 102(3) may be considered unresolved where hosts 102(1), 102(2), and 102(3) previously belonged to another host cluster 101 at backup. Accordingly, virtualization manager 130 may ask an administrator to correct data associated with unresol+ved hosts 102(1), 102(2), and 102(3) stored in virtualization manager database 136.

As mentioned, in certain embodiments, a new host cluster 101 and one or more new hosts 102 may be added to data center 120 subsequent to the backup of virtualization manager 130. In this case, virtualization manager 130, when restored from backup, may not have any information related to this new host cluster 101, nor the new hosts 102. Thus, virtualization manager 130 may not know to query a cluster store 118 associated with this new host cluster 101 to obtain information about these new hosts 102. In certain embodiments, an administrator of host cluster 101 may add data associated with the new host cluster 101, including its hosts 102, to virtualization manager database 136 to reconcile the host membership information.

After reconciliation is performed at block 310 and unresolved hosts are addressed at block 312, then at block 314 virtualization manager 130 may commit the reconciled host membership information to virtualization manager database 136. At block 316, startup of virtualization manager 130 may resume using the reconciled host membership information. After startup is complete, virtualization manager 130 is in an operational state. In the operational state, virtualization manager 130 may be able to respond to API requests, control hosts 102, and provide services to the hosts 102 and host clusters 101 (e.g., data center 120 services such as access control, performance monitoring, and configuration, etc.).

In certain embodiments, an administrator may want hosts 102 to align with a desired host membership rather than the current host membership of hosts 102 and host clusters 101 in data center 120. In some embodiments, the administrator may prefer the current host membership of data center 120 to match the backup host membership information. Accordingly, optionally at operation 318, recovery actions may be used to manipulate the current host membership information maintained in virtualization manager database 136 such that the current host membership information is updated back to the backup host membership information. Such recovery actions may be used to move an identifier of a host 102 from a first host cluster 101 to a second host cluster 101, add an identifier of a host 102 to a host cluster 101, remove an identifier of a host 102 from a host cluster 101, create a host cluster 101, destroy a host cluster 101, and/or the like. Such recovery actions may be used, for example, to make host membership information stored in each cluster store 118 consistent with the backup host membership information, as well as make host membership information stored in virtualization manager database 136 consistent with the backup host membership information. The recovery actions at 318 are performed to update both host membership information stored in each cluster store 118, as well as host membership information stored in virtualization manager database 136.

To reach a desired host membership that is different than the current host membership of data center 120, the backup host membership may first be reconciled to match the current host membership, prior to performing the recovery actions, to avoid any ambiguities during recovery, and to ensure data consistency between virtualization manager database 136 and cluster store(s) 118 prior to making any additional changes.

Figure 4:
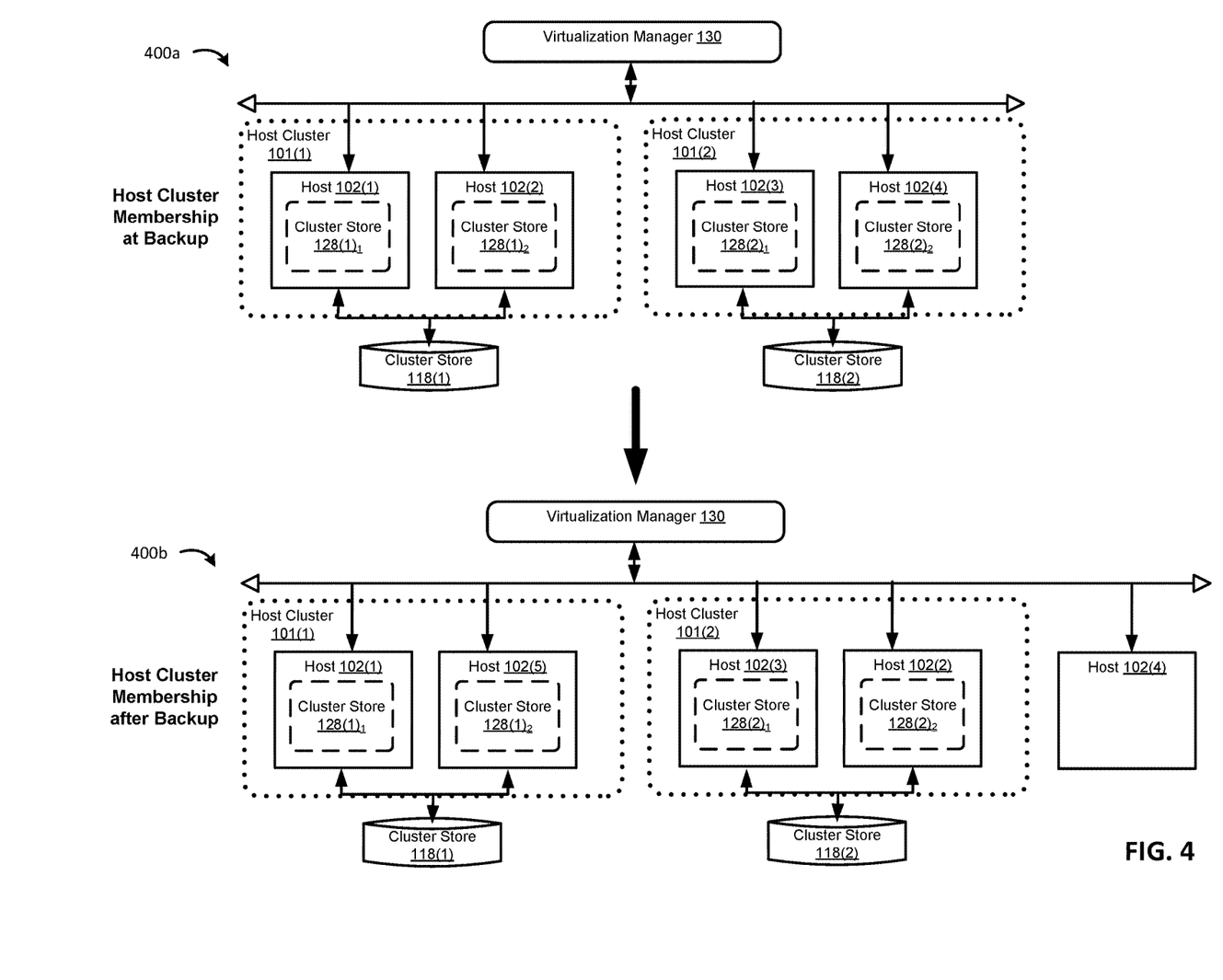
FIG. 4 illustrates an example of host membership changing from when a virtualization manager begins backup and when the virtualization manager is restored according to embodiments of the present disclosure.
Figure 5:
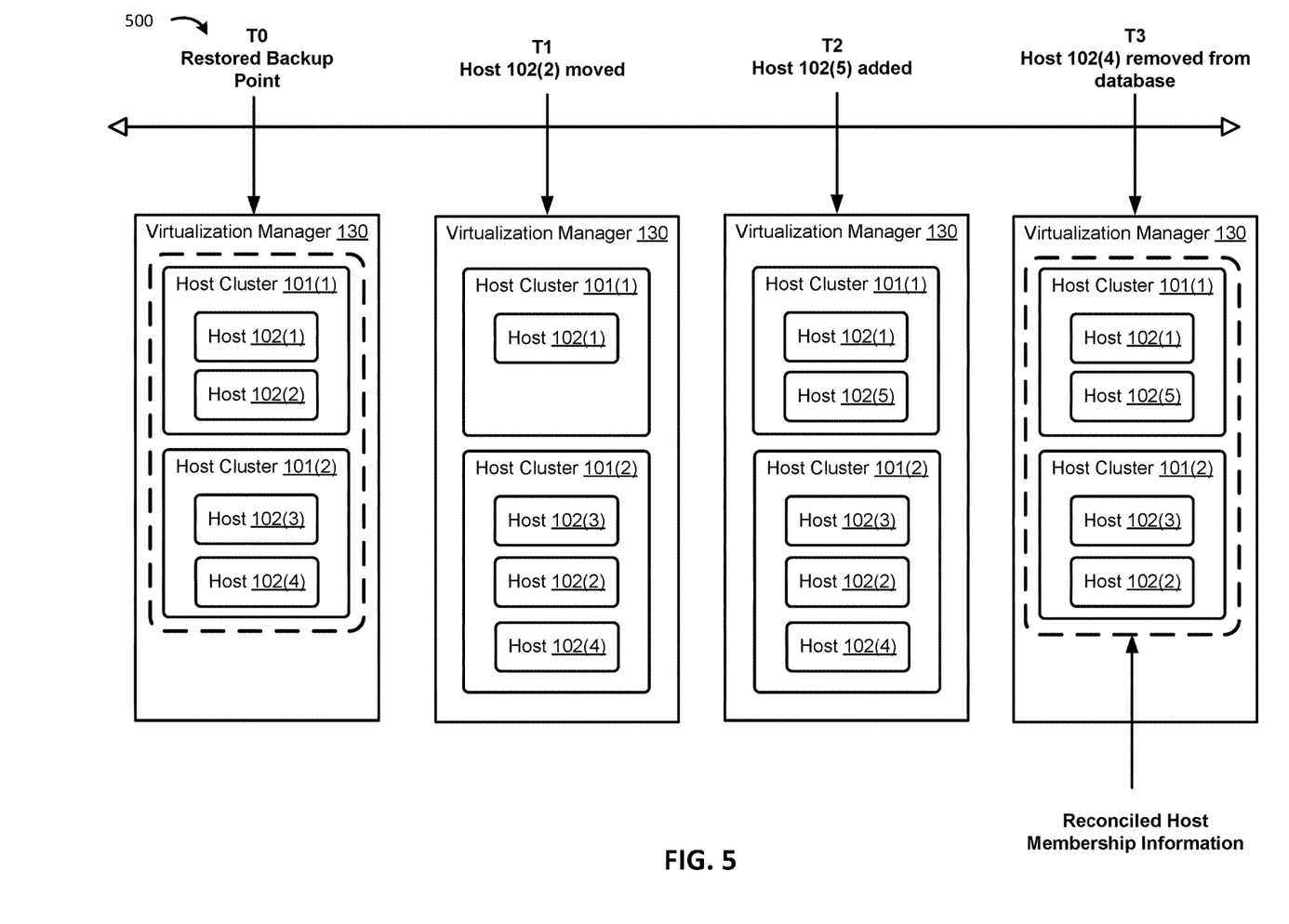
FIG. 5 illustrates reconciliation of the host membership information stored at the virtualization manager to match the current host membership illustrated in FIG. 4 according to embodiments of the present disclosure.

Workflow 300 may be understood with reference to FIGS. 4 and 5, which illustrate example reconciliation of backup host membership, loaded and initialized at virtualization manager 130, to the current host membership of hosts 102 in data center 120.

FIG. 4 illustrates an example of host membership 400a when a backup of virtualization manager 130 is stored and a runtime host membership 400b when virtualization manager 130 is restored from the backup, according to embodiments of the present disclosure. As shown in FIG. 4, when virtualization manger 130 is selected for backup (e.g., by an administrator), data center 120 includes two host clusters (e.g., host cluster 101(1) and host cluster 101(2)). Host 102(1) and host 102(2) belong to host cluster 101(1), while host 102(3) and host 102(4) belong to host cluster 101(2). Host membership information for host membership 400a is stored in virtualization manager database 136 and, when virtualization manager 130 is selected for backup, the host membership information is backed up, such as from virtualization manager database 136 to an external storage.

Further, as shown in FIG. 4, at a later time when virtualization manager 130 is to be restored from backup, the runtime host membership 400b is changed with respect to host membership 400a when a backup of virtualization manager 130 was stored. In the illustrated example, subsequent to the backup of virtualization manager 130, host 102(2) was moved from host cluster 101(1) to host cluster 101(2), host 102(5) was added as a new host in data center 120 to host cluster 101(1), and host 102(4) was removed from host cluster 101(1). Accordingly, at runtime, host cluster 101(1) includes host 102(1) and host 102(5), host cluster 101(2) includes host 102(3) and host 102(2), and host 102(4) does not belong to a host cluster 101 in data center 120.

When virtualization manager 130 is restored from the backup, virtualization manager 130 loads and initializes host membership information (e.g., backup host membership information) for host membership 400a. Virtualization manager 130 then queries each of the cluster store 118(1) and cluster store 118(2) for the current host membership information. The backup host membership information loaded at virtual manager database 136 does not reflect the current runtime host membership 400b, and accordingly, does not match the received host membership from cluster stores 118(1) and 118(2). Accordingly, virtualization manager 130 invokes reconciliation logic to reconcile the backup host membership information.

FIG. 5 illustrates the reconciliation of the backup host membership information (e.g., which reflects host membership 400a) to be consistent with the current runtime host membership 400b illustrated in FIG. 4, according to embodiments of the present disclosure. As shown in FIG. 5, at a time T0, virtualization manager 130 is restored from a backup point. At T0, virtualization manager 130 loads and initializes the backup host membership information. To reconcile the backup host membership information to match the current runtime host membership 400b, virtualization manager 130 updates the backup host membership information to reflect (1) the move of host 102(2) from host cluster 101(1) to host cluster 101(2), (2) the addition of host 102(5) to host cluster 101(1), and (3) the removal of host 102(4) from host cluster 101(1).

For example, at a time T1, virtualization manager 130 updates virtualization manager database 136 to remove host 102(2) from host cluster 101(1) and add host 102(2) as part of host cluster 101(2). At a time T2, virtualization manger 130 updates virtualization manager database 136 to add host 102(5) as part of host cluster 101(1). Further, at a time T3, virtualization manager 130 may indicate to an administrator of data center 120 that the host 102(4) is unresolved. Virtualization manager 130 may ask the administrator to correct information associated with unresolved host 102(4) stored in virtualization manager database 136. In the example illustrated in FIG. 4, host 102(4) was not added to a new host cluster 101; thus, the administrator may remove host 102(4) from the host membership information stored in virtualization manager database 136. Virtualization manager 130 may not know whether any new host cluster 101 was created subsequent to the backup and may allow an administrator to make appropriate changes.

After the operations at time T1-T3 are performed, the host membership information in the virtualization manager database 136 is reconciled (e.g., block 310 of FIG. 3 may be complete) and unresolved hosts 102 have been resolved (e.g., block 312 of FIG. 3 may be complete) such that the host membership information matches the runtime host membership 400b. The reconciled host membership information can then be committed to virtualization manager database 136. Accordingly, virtualization manager 130 may resume and complete the service startup (e.g., block 316 of FIG. 3) at virtualization manager 130.

Figure 6:
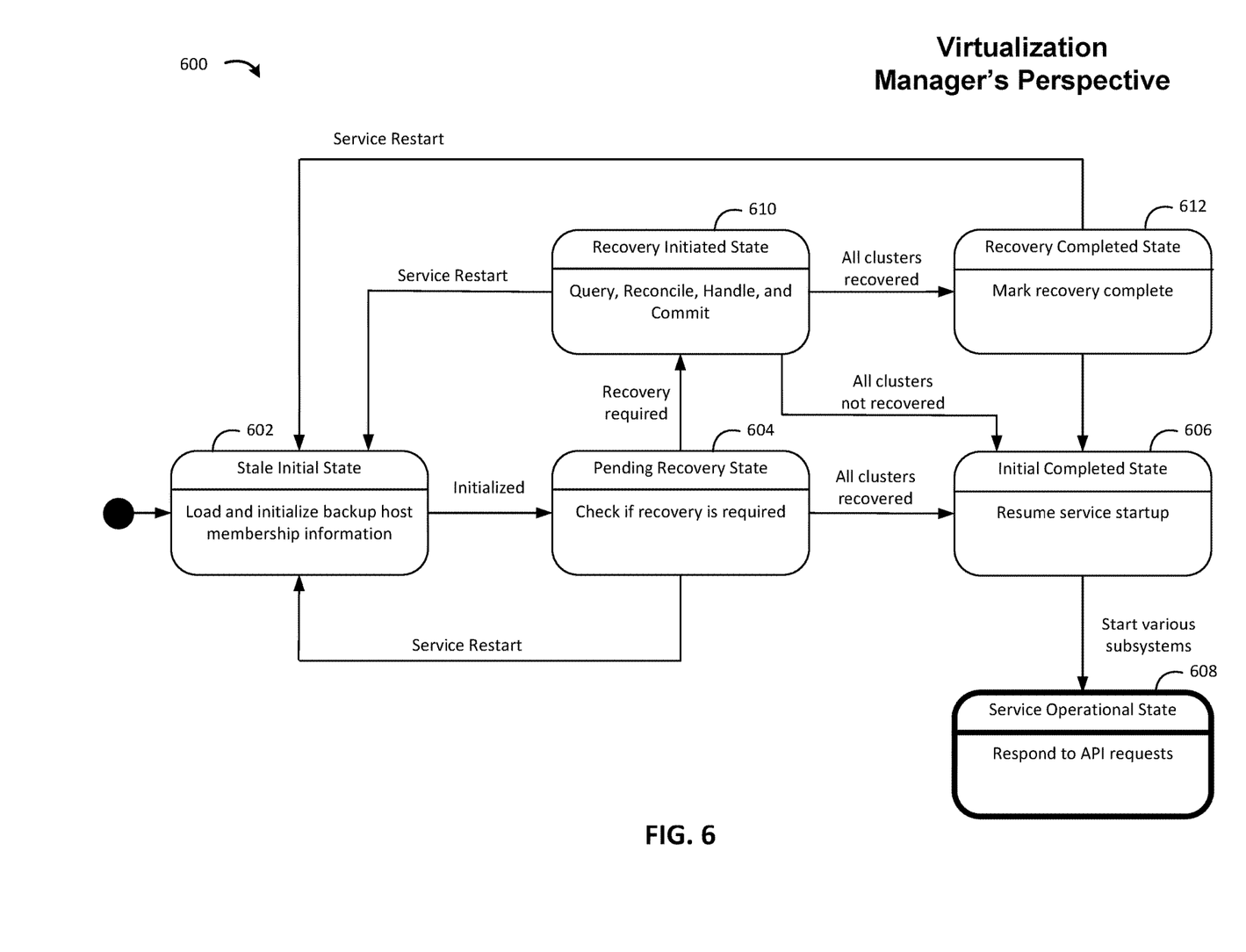
FIG. 6 is an example state diagram illustrating different states defined for the virtualization manager according to embodiments of the present disclosure.

FIG. 6 is an example state diagram 600 illustrating different states defined for virtualization manager 130 according to embodiments of the present disclosure. A state diagram is a type of diagram used to describe the behavior of a system. In particular, state diagram 600 may be a behavioral model consisting of states, state transitions, and actions taken at each state defined for virtualization manager 130. The state represents the discrete, continuous segment of time where virtualization manager 130's behavior is stable. Virtualization manager 130 may stay in a state defined in diagram 600 until the state is stimulated to change by actions taken while virtualization manager 130 is in that state.

As shown in FIG. 6, the initial state of virtualization manager 130 (e.g., the state that virtualization manager 130 will be in immediately following restoration of virtualization manger 130 from a backup) is a "stale initial state" 602. At the "stale initial state" 602, virtualization manager 130 loads and initializes the backup host membership information, from virtualization manager database 136. After this action is taken, the backup host membership information of virtualization manger 130 is initialized even though it is stale. The host membership information initialized at virtualization manger 130 may be stale because, for example, the host membership information may not represent the current host membership of hosts 102 in data center 120.

After the backup host membership information is initialized, virtualization manager 130 is in a "pending recovery state" 604. While in the "pending recovery state" 604, virtualization manager 130 may determine if recovery is required. This determination may be similar to the determination made at block 304 in FIG. 3. In other words, virtualization manager 130 may check a flag to determine whether recovery is completed or required. In some cases, the flag may indicate recovery is not needed where all cluster(s) are recovered; thus, virtualization manager 130 may recover all cluster(s) and transition to an "initial completed state" 606. In some cases, the flag may indicate recovery is needed (e.g., one or more cluster states for one or more host clusters 101 need to be recovered); thus, virtualization manager 130 may transition to a "recovery initiated state" 610. In some cases, virtualization manager 130 may experience a failure while in the "pending recovery state" 604 (e.g., in some cases due to a restart of virtualization manager 130 issued by an administrator); thus, virtualization manager 130 may transition back to the "stale initial state" 602 and perform previously described actions at that state.

In an "initial completed state" 606, virtualization manager may resume startup of various subsystems (e.g., DRS) and services configured at virtualization manager 130. After the various subsystems of virtualization manager 130 are started, virtualization manager is in a "service operational state" 608. In the "service operational state" 608, virtualization manager 130 may respond to API requests, control hosts 102, provide essential data center 120 services such as access control, performance monitoring, and configuration, etc.

In a "recovery initiated state" 610, virtualization manager 130 may (1) access a cluster store 118 associated with each host cluster to query host membership information for the cluster maintained by each cluster store 118, (2) invoke reconciliation logic to reconcile the backup host membership information, (3) handle any unresolved hosts 102, where necessary, and (4) commit the reconciled host membership information to virtualization manager database 136. In some cases, host membership information maintained for all host cluster(s) 101 may be recovered; thus, virtualization manager 130 may transition to a "recovery completed state" 612. In some cases, host membership information maintained for all host cluster(s) 101 may be recovered for less than all host cluster(s) 101; thus, virtualization manager 130 may transition to the "initial completed state" 606 and perform previously described actions at that state. Virtualization manager 130 may transition to the "initial completed state" 606 although host membership information maintained for less than all host cluster(s) 101 is fixed at virtualization manager 130 to allow for operations to continue for host cluster(s) that did have their host membership information in virtualization manager database 136 fixed. In some cases, virtualization manager 130 may experience a failure while in the "recovery initiated state" 610; thus, virtualization manager 130 may transition back to the "stale initial state" 602 and perform previously described actions at that state.

In a "recovery completed state" 612, recovery of virtualization manager 130 is marked as completed. In some cases after recovery is marked as completed, virtualization manager 130 may transition to the "initial completed state" 606 and perform previously described actions at that state. In some cases, virtualization manager 130 may experience a failure while in the "recovery completed state" 612; thus, virtualization manager 130 may transition back to the "stale initial state" 602 and perform previously described actions at that state.

Accordingly, as shown in FIG. 6, virtualization manager 130 may resume service startup and respond to API requests even when host membership information for less than all host cluster(s) is recovered (e.g., is fixed in virtualization manager database 136).

Figure 7:
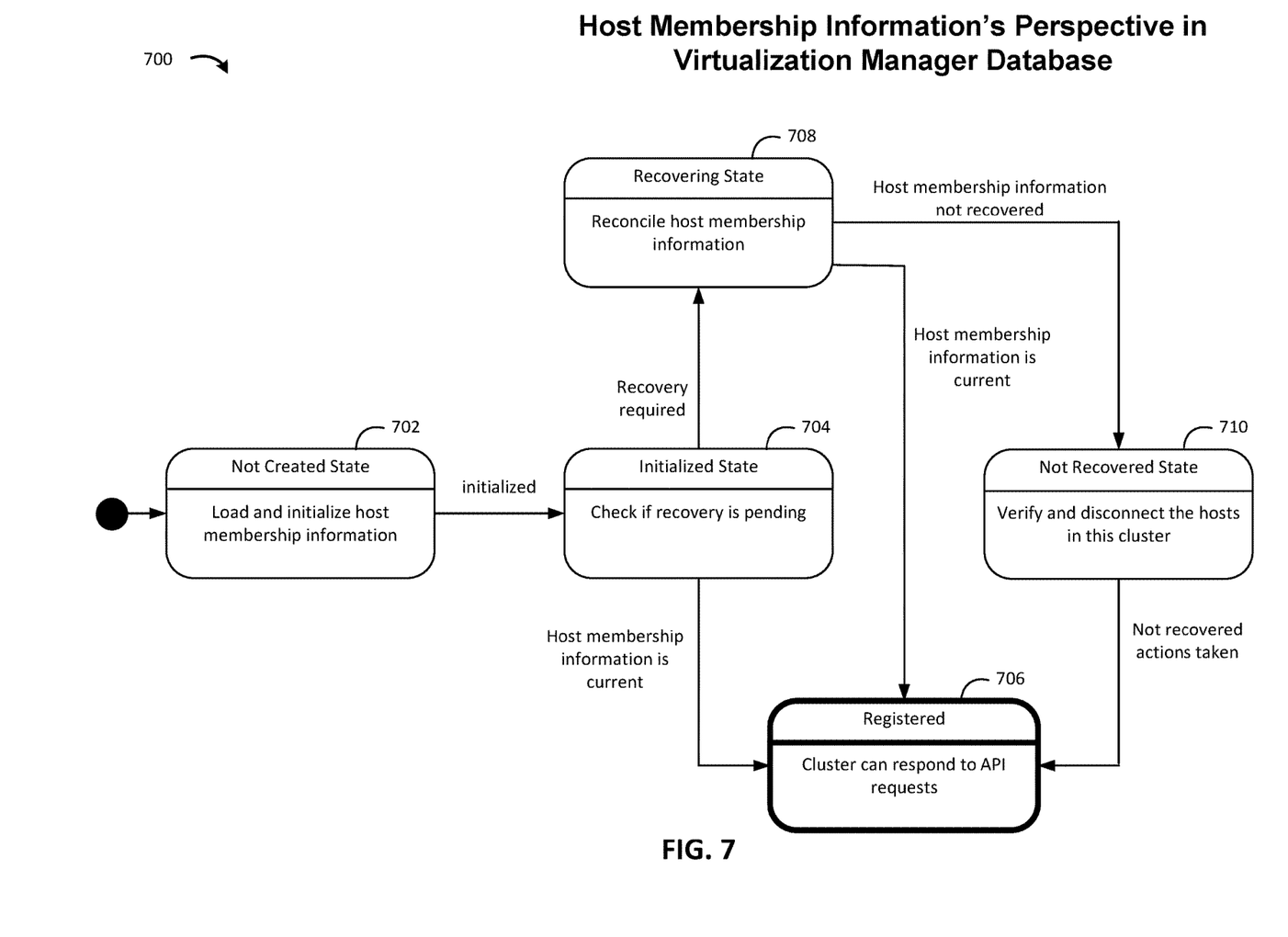
FIG. 7 is an example state diagram illustrating different states defined for the host membership information maintained by the virtualization manager according to embodiments of the present disclosure.

FIG. 7 is an example state diagram 700 illustrating different states defined for the host membership of a cluster maintained by virtualization manager 130 according to embodiments of the present disclosure. As shown in FIG. 7, the initial state of host membership information maintained for a host cluster 101 is a "not created state" 702. At the "not created state" 702, virtualization manager 130 loads and initializes the host membership information for a host cluster 101 from a prior backup. After this action is taken, the host membership information in virtualization manager database 136 is initialized even though it is stale. The host membership information initialized at virtualization manger 130 may be stale because, for example, the host membership information may not represent the current host membership of hosts 102.

After the host membership information for host cluster 101 is initialized, the host membership information is in an "initialized state" 704. While in the "initialized state" 704, virtualization manager 130 may determine if recovery is required. This determination may be similar to the determination made at block 304 in FIG. 3. In other words, virtualization manager 130 may check a flag to determine whether recovery is completed or required for host cluster 101. In some cases, the flag may indicate recovery is not needed where host cluster 101 is recovered; thus, the initialized host membership information for host cluster 101 may be current and the state of the host membership information may be considered to be "registered" 706. Where the host membership information is "registered" 706, the host cluster 101 associated with the "registered" 706 host membership information in virtualization manager database 136 may operate and respond to one or more API requests.

In some cases, the flag may indicate recovery is needed (e.g., host cluster 101 needs to be recovered); thus, the state of the host membership information may be considered to be in a "recovering state" 708. While in a "recovering state" 708, the host membership information maintained in virtualization manager database 136 may be reconciled. In some cases, the host membership information is reconciled; thus, the host membership information is current and the state of the host membership information may be considered to be "registered" 706. In some cases, the host membership information may not be reconciled, thus, the host membership information may not be recovered. Accordingly, the state of the host membership information may be in a "not recovered state" 710. While in the "not recovered state" 710, hosts 102 in this host cluster 101 may be disconnected from virtualization manager 130.

To reconnect hosts 102 of host cluster 101 with virtualization manager, one or more actions may be taken. For example, an administrator may reconnect the hosts 102 in host cluster 101 and manually reconcile host membership information for this host cluster 101 in virtualization manager database 136. Where such actions are taken and completed, the state of the host membership information may be considered to be "registered" 706, and the host cluster 101 associated with the "registered" 706 host membership information in virtualization manager database 136 may operate and respond to one or more API requests.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), NVMe storage, Persistent Memory storage, a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s). In the claims, elements and/or steps do not imply any particular order of operation, unless explicitly stated in the claims.

We claim:

1. A method for reconciling host membership information in a data center, the method comprising:
   querying, by a remote central virtualization management device configured to manage one or more host clusters in the data center and to provision virtual computing instances (VCIs) on hosts in the one or more host clusters, one or more cluster stores to retrieve first host membership information for each of the one or more host clusters, each cluster store being associated with a host cluster of the one or more host clusters;
   comparing second host membership information stored at the remote central virtualization management device for the one or more host clusters to the first host membership information to identify one or more discrepancies between the second host membership information and the first host membership information; and
   updating the second host membership information such that the second host membership information is consistent with the first host membership information by using one or more provisioning primitives, wherein the one or more provisioning primitives comprise one or more smallest units of processing available to the remote central virtualization management device to perform an update to the second host membership information, and wherein the one or more provisioning primitives are also invoked by the remote central virtualization management device when provisioning the VCIs.

2. The method of claim 1, wherein querying, by the remote central virtualization management device, the one or more cluster stores is triggered when the remote central virtualization management device is restored from a backup of data containing the second host membership information or is triggered by an administrator.

3. The method of claim 1, wherein the one or more provisioning primitives comprise one or more provisioning primitives configured for the data center for at least one of:
   adding an identifier of a host to the second host membership information;
   removing an identifier of a host from the second host membership information; or
   updating an association of an identifier of a host in the second host membership information with membership in a first host cluster of the one or more host clusters to an association with membership in a second host cluster of the one or more host clusters.

4. The method of claim 1, further comprising:
   identifying one or more identifiers of one or more hosts in the second host membership information that are unresolved, wherein a host is unresolved when the remote central virtualization management device does not retrieve first host membership information for the host; and
   notifying an administrator of the data center to correct data associated with the one or more identifiers of the one or more unresolved hosts in the second host membership information.

5. The method of claim 1, further comprising:
   updating the updated second host membership information stored at the remote central virtualization management device and the first host membership information in the one or more cluster stores to match third second host membership information different than the updated second host membership information and the first host membership information.

6. The method of claim 1, wherein each of the one or more cluster stores comprises a distributed cluster store across a plurality of hosts in a respective host cluster.

7. The method of claim 1, further comprising using the updated second host membership information, by the remote central virtualization management device, to provide services to hosts in the one or more host clusters.

8. A system comprising:
one or more processors; and
at least one memory, the one or more processors and the at least one memory configured to:
- query, by a remote central virtualization management device configured to manage one or more host clusters in a data center and to provision virtual computing instances (VCIs) on hosts in the one or more host clusters, one or more cluster stores to retrieve first host membership information for each of the one or more host clusters, each cluster store being associated with a host cluster of the one or more host clusters;
- compare second host membership information stored at the remote central virtualization management device for the one or more host clusters to the first host membership information to identify one or more discrepancies between the second host membership information and the first host membership information; and
- update the second host membership information such that the second host membership information is consistent with the first host membership information by using one or more provisioning primitives, wherein the one or more provisioning primitives comprise one or more smallest units of processing available to the remote central virtualization management device to perform an update to the second host membership information, and wherein the one or more provisioning primitives are also invoked by the remote central virtualization management device when provisioning the VCIs.

9. The system of claim 8, wherein querying, by the remote central virtualization management device, the one or more cluster stores is triggered when the remote central virtualization management device is restored from a backup of data containing the second host membership information or is triggered by an administrator.

10. The system of claim 8 wherein the one or more provisioning primitives comprise one or more provisioning primitives configured for the data center for at least one of:
- adding an identifier of a host to the second host membership information;
- removing an identifier of a host from the second host membership information; or
- updating an association of an identifier of a host in the second host membership information with membership in a first host cluster of the one or more host clusters to an association with membership in a second host cluster of the one or more host clusters.

11. The system of claim 8, wherein the one or more processors and the at least one memory are further configured to:
- identify one or more identifiers of one or more hosts in the second host membership information that are unresolved, wherein a host is unresolved when the remote central virtualization management device does not retrieve first host membership information for the host; and
- notify an administrator of the data center to correct data associated with the one or more identifiers of the one or more unresolved hosts in the second host membership information.

12. The system of claim 8, wherein the one or more processors and the at least one memory are further configured to:
- update the updated second host membership information stored at the remote central virtualization management device and the first host membership information in the one or more cluster stores to match third second host membership information different than the updated second host membership information and the first host membership information.

13. The system of claim 8, wherein each of the one or more cluster stores comprises a distributed cluster store across a plurality of hosts in a respective host cluster.

14. The system of claim 8, wherein the one or more processors and the at least one memory are further configured to use the updated second host membership information, by the remote central virtualization management device, to provide services to hosts in the one or more host clusters.

15. A non-transitory computer-readable medium comprising instructions that, when executed by one or more processors of a computing system, cause the computing system to perform operations for reconciling host membership information in a data center, the operations comprising:
- querying, by a remote central virtualization management device configured to manage one or more host clusters in the data center and to provision virtual computing instances (VCIs) on hosts in the one or more host clusters, one or more cluster stores to retrieve first host membership information for each of the one or more host clusters, each cluster store being associated with a host cluster of the one or more host clusters;
- comparing second host membership information stored at the remote central virtualization management device for the one or more host clusters to the first host membership information to identify one or more discrepancies between the second host membership information and the first host membership information; and
- updating the second host membership information such that the second host membership information is consistent with the first host membership information by using one or more provisioning primitives, wherein the one or more provisioning primitives comprise one or more smallest units of processing available to the remote central virtualization management device to perform an update to the second host membership information, and wherein the one or more provisioning primitives are also invoked by the remote central virtualization management device when provisioning the VCIs.

16. The non-transitory computer-readable medium of claim 15, wherein querying, by the remote central virtualization management device, the one or more cluster stores is triggered when the remote central virtualization management device is restored from a backup of data containing the second host membership information or is triggered by an administrator.

17. The non-transitory computer-readable medium of claim 15, wherein the one or more provisioning primitives comprise one or more provisioning primitives configured for the data center for at least one of:
- adding an identifier of a host to the second host membership information;
- removing an identifier of a host from the second host membership information; or
- updating an association of an identifier of a host in the second host membership information with membership in a first host cluster of the one or more host clusters to an association with membership in a second host cluster of the one or more host clusters.

18. The non-transitory computer-readable medium of claim 15, wherein the operations further comprise:
- identifying one or more identifiers of one or more hosts in the second host membership information that are unresolved, wherein a host is unresolved when the remote central virtualization management device does not retrieve first host membership information for the host; and
- notifying an administrator of the data center to correct data associated with the one or more identifiers of the one or more unresolved hosts in the second host membership information.

19. The non-transitory computer-readable medium of claim 15, wherein the operations further comprise:
- updating the updated second host membership information stored at the remote central virtualization management device and the first host membership information in the one or more cluster stores to match third second host membership information different than the updated second host membership information and the first host membership information.

20. The non-transitory computer-readable medium of claim 15, wherein each of the one or more cluster stores comprises a distributed cluster store across a plurality of hosts in a respective host cluster.

* * * * *